United States Patent [19]

Bötsch et al.

[11] 4,158,092

[45] Jun. 12, 1979

[54] PROCESS FOR THE MANUFACTURE OF VINYL CHLORIDE POLYMER DISPERSIONS WITH A LOW MONOMER CONTENT

[75] Inventors: Franz Bötsch, Burgkirchen; Christoph Heinze, Burghausen; Horst Wolff, Neuötting, all of Fed. Rep. of Germany

[73] Assignee: Hoechst Aktiengesellschaft, Frankfurt am Main, Fed. Rep. of Germany

[21] Appl. No.: 845,479

[22] Filed: Oct. 26, 1977

Related U.S. Application Data

[63] Continuation of Ser. No. 597,456, Jul. 21, 1975, abandoned.

[30] Foreign Application Priority Data

Jul. 25, 1974 [DE] Fed. Rep. of Germany ....... 2435704
Jul. 18, 1975 [DE] Fed. Rep. of Germany ....... 2532173

[51] Int. Cl.² .............................................. C08F 6/16
[52] U.S. Cl. .................................. 528/500; 159/48 L; 239/223; 260/29.6 PT; 260/884; 526/344.2; 528/501
[58] Field of Search ................ 528/500, 501; 526/344; 159/DIG. 10, 4 R, 4 CC, 4 B, 4 MS, 4 GC, 48 L, 48 R; 239/223; 260/29.6 PT, 884

[56] References Cited

U.S. PATENT DOCUMENTS

| 1,959,301 | 5/1934 | Northcutt | 159/45 |
|---|---|---|---|
| 2,349,412 | 5/1944 | Douglas | 528/502 |
| 2,514,207 | 7/1950 | Johnson | 207/73 |
| 2,974,131 | 3/1961 | McLeod | 528/499 |
| 3,151,984 | 10/1964 | Peebles | 159/4 S |
| 3,266,085 | 8/1966 | Nacke | 159/4 CC |
| 3,477,094 | 11/1969 | Maahs | 159/2 E |
| 3,547,865 | 12/1970 | Hoch | 528/502 X |
| 3,563,975 | 2/1971 | Zavasnik | 528/502 X |
| 3,777,262 | 11/1973 | Clementi | 528/500 |
| 3,956,249 | 5/1976 | Goodman | 528/500 |

FOREIGN PATENT DOCUMENTS 2162860 7/1972 Fed. Rep. of Germany ........... 528/502

Primary Examiner—C. A. Henderson, Jr.
Attorney, Agent, or Firm—Connolly and Hutz

[57] ABSTRACT

Polymer dispersions are subject to a spray treatment to reduce the monomer content thereof. The dispersions are sprayed against the wall of the vessel by means of at least one spray nozzle.

The residual monomer content of polymer dispersions is further reduced by spraying them in at least two series connected vessels, conducting the escaping gaseous constituents in one direction and the dispersion in opposite direction from one vessel to the next. The process is little liable to troubles and ensures a very effective monomer removal without thermal damage of the polymer.

11 Claims, 8 Drawing Figures

PROCESS FOR THE MANUFACTURE OF VINYL CHLORIDE POLYMER DISPERSIONS WITH A LOW MONOMER CONTENT

CROSS REFERENCES TO RELATED APPLICATIONS

This application is a continuation of copending commonly assigned U.S. patent application Ser. No. 597,456, filed July 21, 1975 now abandoned and superseded by Ser. No. 777,719, filed Mar. 15, 1977, now abandoned and Ser. No. 704,773, filed July 13, 1976, now abandoned by the same inventors.

BACKGROUND OF THE INVENTION

This invention relates to a process and a device for a spray treatment of polymer dispersions to reduce the content of monomers thereof.

The monomer content of polymer dispersions should be as low as possible for various reasons. On the one hand, during storage of the dispersions the monomers still present can react in uncontrolled manner and thus detrimentally affect the properties of the dispersions and the coatings made therefrom. On the other hand, monomers evaporating with the water when the dispersions are dried may be injurious to health. Especially in the processing of dispersions to obtain plastics powders, for example in the industrial production of polyvinyl chloride, considerable monomer amounts escape with the drying air if the dispersions have a high monomer content, for example above 0.1% by weight, which must be reduced because of environmental protection. Moreover, packing material for foodstuff made from dispersions having a high monomer content may alter the odor and taste of the packed goods so that they may become unpalatable.

Various processes have been proposed to reduce the monomer content of aqueous polymer dispersions.

In general, the monomers are removed by pressure release of the polymerization mixture.

It is also known to free polymer dispersions of monomers by passing through steam or inert gases. To this effect considerable amounts of steam or gas are required which cause difficulties, above all in the case of dispersions tending to foam. The addition of defoamers increases the expenses, is not always effective and may detrimentally affect the properties of the dispersions. To avoid the aforesaid difficulties it has also been proposed to destroy, by a rapid pressure reduction, the foam formed during the passage of steam at a speed of more than 100 m/sec, to separate the steam from the broken dispersion foam and to add the foam to the boiling dispersion. This process is carried out in continuous manner, the steam consumption is high and the expenditure pertaining to apparatus is considerable.

According to another known process the dispersion is mixed with steam or hot inert gases in a tube and after a short period of time the three phase mixture is divided again into dispersion and gaseous phase. It has also been proposed to atomize polymer dispersions in steam flowing at a high speed, to pass the mixture between heated plates to a release zone where the dispersion is separated from the gaseous phase is a cyclone. The two latter processes are carried out continuously but also require high amounts of steam and considerable expenditures pertaining to apparatus. Inspite of the high velocity of flow, the dispersion is easily overheated, and coagulations and backing of the polymers on the walls of the apparatus may occur. Moreover, monomers included in the polymer core, which require a certain diffusion time, are removed to an insufficient extent only. In most cases a prior degassing is necessary.

In another known process the dispersion is conducted in a tube in counter current flow with steam. In this case, too, the expenditure pertaining to apparatus is relatively high and with high passage rates dispersions with low surface tension start to foam. Moreover, deposits of solids may readily cause clogging.

Finally, it has been proposed to spray the dispersion into a steam atmosphere in such a manner that the sprayed particles fall through the steam owing to gravity. For this process a large and relatively expensive vessel is required.

SUMMARY OF THE INVENTION

The present invention provides a continuous process which ensures an effective removal of monomers from polymer dispersions with relatively little expenditure pertaining to apparatus and little energy consumption, especially from dispersions which tend to foam and form incrustations in parts of the apparatus, are sensitive to shearing and high temperatures and require a prolonged treatment time, for example more than 30 minutes, for a substantial removal of the monomers.

According to the invention a polymer dispersion, prepared by emulsion or suspension polymerization of the monomer(s) in aqueous phase, pressure release of the polymerization mixture and removal and condensation of the gaseous products, is subjected to a treatment which comprises spraying the optionally heated dispersion against the internal wall of the vertical and preferably axially symmetrical vessel, e.g. radially in the form of a hollow cone or a disk formed of droplets having a diameter of at most 6 mm (measured by the method of Fraser-Eisenklam Trans. Instn. Chem. Engs., volume 34, pages 301–302 (1956) with a dispersion of 20° C. at atmospheric pressure), allowing the sprayed dispersion to run down the wall and collecting it at the bottom of the vessel, while removing gaseous constituents above the outlet of the dispersion from the spraying device.

It proved advantageous to use a vertical cylindrical vessel. There may be used, for example, the dispersion storage tanks mostly used in polymerization plants. The treatment can also be effected in several series connected vessels.

Figure 5:
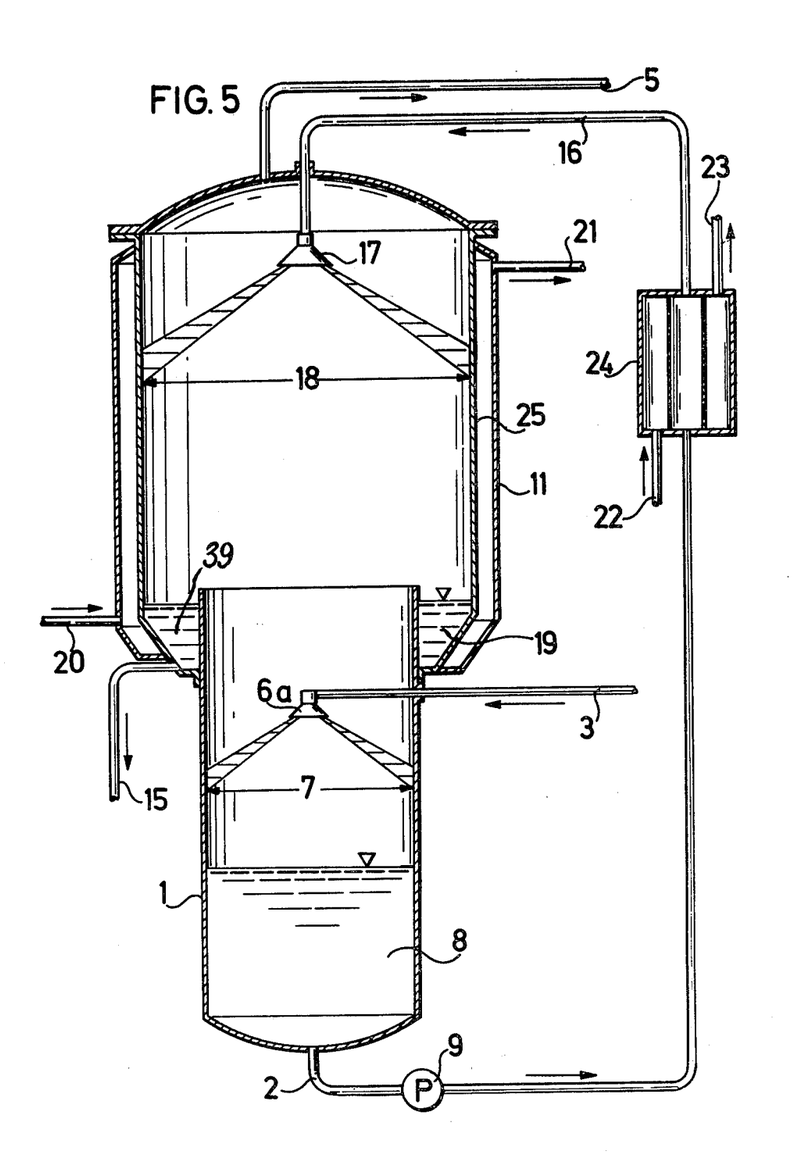

The vessel can be composed of two or more superimposed cylindrical parts, in which case the lower part having a smaller diameter projects concentrically into the upper part having a larger diameter (cf. FIG. 5 of the drawing). The ring-shaped groove formed should have a least one outlet for the liquid. Each of the cylindrical parts can be provided with a spraying device which can be connected in such a manner that the treatment can be carried out in one vessel in several successive stages.

The wall of the vessel can be provided with heating or cooling means over its entire surface or over parts thereof, for example a jacket through which a liquid heating or cooling medium is circulated. It may be advantageous to heat or cool the wall of the vessel in the areas in which it is hit internally by the sprayed dispersion. It may be suitable to equip the vessel with stirring means for the contents and to provide for one or several gas inlets.

To spray the dispersion, there is preferably used at least one spray nozzle emitting the spray in the form of a hollow cone which is mounted in the upper part of the vessel in such a manner that the axis of the hollow cone of sprayed material is approximately congruent with the axis of the vessel. The material is preferably sprayed in downward direction.

The scattering angle of the hollow cone, i.e. the angle between two opposite surface lines of the cone of sprayed material should be in the range of from 30° to 180°, that is to say the material can also be sprayed in the form of a horizontal disk. A scattering angle of from 80° to 120° is preferably chosen.

As nozzle to form the hollow cone of sprayed material a one substance nozzle is preferred, for example a spiral or an excentric nozzle, for example, as described in Chemical Eng. Prog. volume 49, pages 185–186 forming a sharply defined hollow cone.

In the nozzle the most narrow cross sectional area for the passage of the dispersion should correspond to about two times the diameter of the solid particles in the dispersion. In general, a free cross section of the passage area of at least 1 mm will be chosen for capacity reasons, a cross section of the passage area of from 5 to 100 and more advantageously from 10 to 50 mm being preferred.

The spray nozzle should spray the dispersion in such a manner that the largest droplets have a diameter of at most 6 mm. Especially good results are obtained when the average size of the droplets, determined as described above with a dispersion of 20° C. at atmospheric pressure, is in the range of from 0.05 to 3 mm.

The issuing speed of the droplets from the spray nozzle, determined by the method of H.Hege, Aufbereitungstechnik 1969, pages 142–143, is preferably in the range of from 5 to 250 m/sec., more preferably 10 to 100 m/sec.

After having left the spray nozzle and before hitting the wall of the vessel, the droplets should cover a distance of at least 20 cm. The largest distance which is at most 400 cm is determined by economical considerations with regard to the dimensions of the vessel and by the size and issuing speed of the droplets, a distance in the range of from 40 to 200 cm being preferred.

After having hit the wall of the vessel, the droplets form a thin layer which flows downward, collects in the lower part of the vessel and is withdrawn through an outlet. The level of the liquid in the vessels, which may be stirred, should be regulated in such a manner that at most a minor proportion, for example less than 5% by weight, of the sprayed dispersion strikes the surface of the liquid. One half or more of the vessels can be filled with dispersion and simultaneously they may serve as collecting and homogenizing vessels. In general, the level of the dispersion in the vessel will not be too high, since the sprayed dispersion, while running down the wall of the vessel, is additionally degassed and with a high level of the dispersion the danger increases that sprayed droplets directly fall on the surface of the dispersion. It is expedient to choose a level of the dispersion in each vessels of about 1/10 to ½ of the total inner height of each vessels. To have space for a large amount of dispersion in a vessel having a relatively small total volume without too high a liquid level the upper part of the vessel may have a smaller diameter, for example ¼ to ¾ of the diameter of the lower part. To improve the degassing effect, the dispersion is preferably heated prior to spraying to a temperature of from 50° to 150° C., more preferably 70° to 100° C.

Heating of the dispersion in the vessel can be effected by a heatable jacket or by introducing steam into the dispersion. In the latter case, the total amount of steam should condense in the liquid and the liquid should not start to boil.

It is expedient to maintain in the vessel a pressure above the saturation pressure of steam above the dispersion collected in the lower part of the vessel. In general, the pressure should be not more than 200 mm Hg, preferably not more than 100 mm Hg below the saturation pressure of the steam in the sprayed dispersion. It can also be equal to the saturation pressure of the steam of the sprayed dispersion or exceed that value by at most 500 mm Hg. During the prolonged period of treatment, which is often required to remove the monomers larger amounts of water should not evaporate with the monomer(s) in order not to reduce unnecessarily the economy of the process, not to thicken the dispersion to an undesired extent and not to deteriorate the quality of the final product. In general, the dispersion has a satisfactory content of residual monomer with an evaporated amount of water of from 0.2 to 5 kg for 100 kg of dispersion. In some cases, it may, however, be expedient to evaporate more than 5 kg water for 100 kg dispersion.

The pressure necessary for spraying the dispersion can be produced by a pump or other suitable means. It is also possible, however, directly to spray the dispersion under pressure originating from the polymerization.

Prior to spraying, the dispersion can be heated either indirectly in the conduit to the spray nozzle, for example by a heat exchanger, or directly by introducing steam. In the latter case, at most a minor amount of a gaseous phase, for example less than 5% by volume, should be formed. The proportion of the gaseous phase should be as low as possible.

The process of the invention can be carried out in one or several series-connected vessels. The sprayed dispersion is collected and passed again through the spraying device of the same vessel or preferably to the spraying device of a following vessel. In certain cases it may be of advantage partially to recycle the dispersion in the same vessel and to pass the remainder to the following vessel. The series-connected vessels can be mounted one beside or one above the other with the gas spaces of the individual vessels expediently being separated from one another.

The vapors escaping during the spraying of the dispersion are withdrawn through an opening above the spraying device, condensed and optionally recycled to a recovery plant for the monomers. To improve the removal of volatile constituents from the dispersion, inert gases can be introduced into the gas space of the vessel in which the dispersion is sprayed, for example air, nitrogen, or preferably optionally superheated steam. When the dispersion is treated in several series-connected vessels, the consumption of the inert gas can be reduced by passing the gaseous constituents removed from the vessels in countercurrent flow to the dispersion from vessel to vessel.

Besides the spraying device described above, other modes of construction may also be used, for example an arrangement of a plurality of nozzles one above the other on the axis of the container and each producing a hollow cone of sprayed material with as little as possible overlapping of the individual spray cones (cf. FIG. 2 of the drawing), or an arrangement of at least 2 and preferably 3 to 12 nozzles on a concentric ring around the axis of the vessel emitting flat rays in the shape of circle sectors which hit equally large portions of the opposite wall under equal angles of from 15° to 90°, preferably 40° to 60° (cf. FIG. 3).

Figure 4:
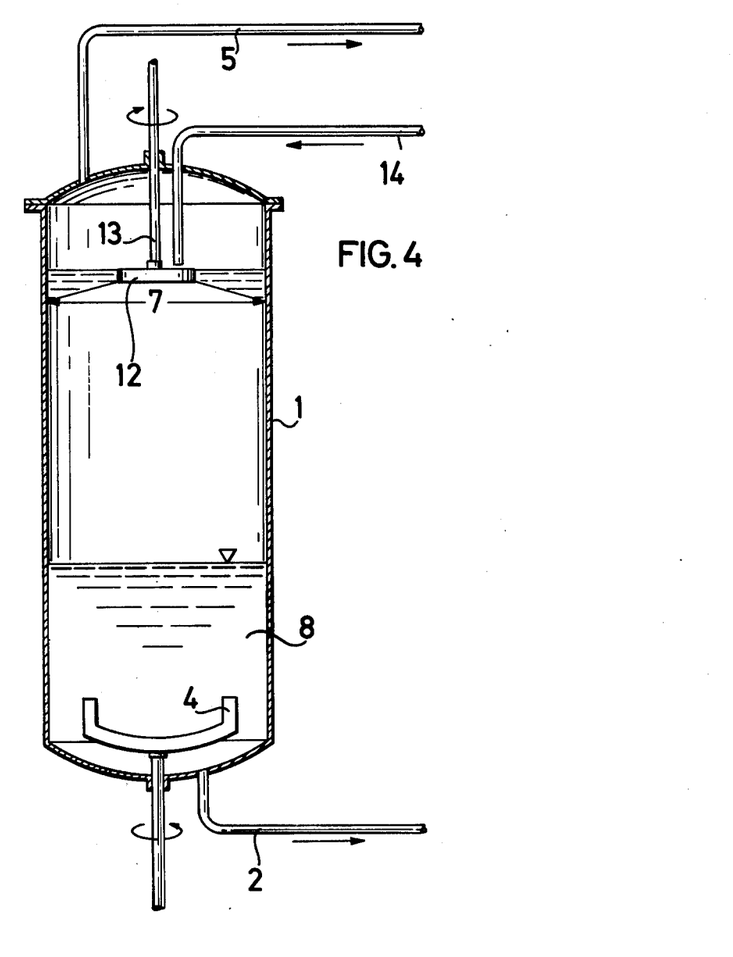

It is likewise possible to use a rotating disk as spraying device, the axis of rotation of which is congruent with the axis of the vessel (cf. FIG. 4). The process of the invention can be combined with other processes for the removal of monomers from dispersions. It can be used with special advantage in all cases where foaming problems occur, especially when relatively large amounts of gas escape from dispersions tending to foam.

It has been found that the efficiency of the aforesaid process can be considerably improved by spraying the dispersion in at least 2 series-connected vessels, transporting the gaseous constituents formed in one direction only from one vessel to the next, optionally while adding at least one inert gas, and conducting the dispersion in the opposite direction.

The dispersion is preferably sprayed in 2 to 10 and more preferably 2 to 6 series-connected vessels. If more than 10 vessels are used, the additional effect achieved in each further vessel is generally so small that the surplus expenditure pertaining to apparatus is not warranted. It is likewise possible to combined a plurality of vessels in a larger unit.

The dispersion is fed to each vessel by means of a spray device, withdrawn from the bottom part and passed into the next vessel, or discharged from the last vessel in the direction of flow. Simultaneously, the gaseous substances are introduced above the level of the dispersion collected in the lower part of the vessel, the gases are withdrawn above the spray nozzle and discharged or passed into the following vessel in countercurrent flow with the dispersion. The gaseous substances are preferably discharged only from the last vessel in the direction of flow. With consideration of the velocity of flow, the cross sections of the conduits for the media flowing therein should be such that the remixing of the dispersion and the gaseous constituents cannot take place from vessel to vessel.

To improve the removal of the gaseous constituents, one or more inert gases can be introduced into at least one of the vessels, preferably into the last vessel in the direction of flow. Suitable inert gases are, for example, nitrogen, air carbon dioxide, and preferably superheated steam.

According to the preferred embodiment of the process of the invention the gaseous substances are introduced into the gas space of the following vessel in such a manner that it streams through the hollow cone formed by the sprayed dispersion, introduction being preferably effected through an inlet opening not far from the dispersion nozzle and disposed in such a manner that it is neither hit by the spray from the nozzle nor flooded by the dispersion collected in the lower part of the vessel. This arrangement ensures a very intense substance exchange between gaseous and liquid phase.

The dispersion in the vessels can be stirred, preferably with laterally inserted stirring means or stirrers introduced through the bottom. Alternatively, the stirring and spraying means can both be inserted from above, for example when the spray device is composed of several segment nozzles disposed on a ring around the shaft of the stirrer.

To improve the degassing effect, the dispersion is preferably heated to 50° to 120° C. prior to spraying. Heavy boiling of the dispersion should be avoided since it would generally involve foaming. A weak evolution of gas in the dispersion will generally not cause difficulties. The steam can be supplied to the vessel or advantageously to the dispersion conduit to the spray nozzle.

This invention further provides apparatus to carry out the process of the invention comprising at least two vertical, preferably axially symmetrical vessels each having a gas outlet in the upper part and at least one liquid outlet in the lower part, optionally means to heat or cool and/or agitate the contents of the vessels, in the upper part of each vessel a spray device consisting of at least one spray nozzle producing a hollow cone of sprayed material, the opening of which nozzle is directed downwardly in a manner such that the axis of the hollow cone approximately coincides with the axis of the vessel, wherein each vessel is provided, in a position below the spray nozzle, with at least one, optionally roofed gas inlet, fed from the outside and disposed in such a manner that it is not hit by the sprayed dispersion emitted from the nozzle and not flooded by the dispersion collected in the lower part of the vessel.

Another apparatus according to the invention preferably consists of one vessel subdivided by one or more, preferably horizontal partition walls, into two or more superposed chambers each containing a spray device in its upper part producing a hollow cone of sprayed material. Each partition wall has at least one opening with tightly fitted ascending tube with open end below the spray device, which open end may be roofed by a sort of cap. In the lower part each chamber has at least one opening for the removal of liquid, which opening, with the exception of the opening in the lowest chamber of the vessel, is connected with the spray device of at least one other chamber by means of a pump and optionally installations to heat or cool the flowing liquid. An arrangement of this type requires little space and pipes for transporting the gas from one chamber to the other are relatively short.

Besides the hollow cone nozzle other spray devices may be advantageous, for example an assembly of several nozzles producing several hollow cones on the axis of the vessel one above the other, whereby the cones of sprayed material of the individual nozzles interfere as little as possible with one another. A spray device can also be used which is composed of at least 2 and preferably 3 to 12 nozzles on a concentric ring around the axis of the vessel emitting flat jets in the shape of segments which hit equally large portions of the opposite wall under equal angles of from 15° to 90°, preferably 40° to 60°. Alternatively, a rotating disk can be used as spray device, the axis of rotation of which is congruent with the axis of the vessel.

The process of the invention is little liable to troubles and permits in simple manner the production of dispersions of low monomer content, for example less than 0.03% by weight or with repeated spraying even far less, in many cases with the equipment already present by mounting little expensive additional installations. By spraying the particles of the dispersion onto the optionally heated wall of the vessel a very good degassing effect is obtained without detrimental foam formation. It is particularly advantageous that up to 10% by weight, calculated on the dispersion, of larger particles having a diameter of up to 5 mm do not cause any trouble.

The process of the invention permits a continuous treatment of aqueous polymer dispersions without thermal damage and during a short period of time with a low consumption of inert gas whereby residual vinyl chloride contents are obtained which are so low that no environmental pollution occurs during the further processing of the dispersion. It is possible, for example, to treat polyvinyl chloride dispersions, obtained by emulsion polymerization, for example at 70° C., and to obtain in a few minutes residual vinyl chloride contents which are far below 150 mg/m$^3$ exhaust air in the subsequent spray drying. It is even possible to obtain in a relatively short period of time residual monomer contents of 0.001% by weight (=10 ppm, calculated on solid polymer having a moisture content of 20%) and there below.

Difficulties by deposits and incrustation on the walls of the vessels do practically not occur. When readily condensable inert gases, especially steam, are used, the recovery and re-use of the expelled residual monomers is neither difficult nor does it require much expenses. The introduction of the inert gases at a height above the liquid level prevents the formation of undesired foam.

A further advantage of the process of the invention resides in the fact that, because of the more effective degassing, apparatus of smaller dimensions can be used. The treatment in several stages considerably reduces the residence time of the polymer particles in the apparatus whereby higher temperatures and shorter treating times become possible without thermal damage of the polymer particles.

By the removal and recovery of physiologically harmful substances directly after polymerization, noxious emissions into the environmental atmosphere are avoided in a very early state of the polymer manufacture.

The treated dispersions can be used as such or they can be further processed to obtain the solid polymer by a known process, optionally after centrifugation or another method of concentration, for example by spray, conveying or contact drying, without the drying air being polluted by residual monomers.

The process of the invention does practically not alter the properties of the dispersions. The dispersions as well as the dry polymers made therefrom can be used in usual manner and in this case, too, troubles caused by the monomer(s) do not occur or are substantially done away with.

The treatment according to the present invention is especially suitable for polymer dispersions which are sensitive to shearing forces and elevated temperature, tend to foam and form incrustations in the apparatus and difficulty give off the monomers, for example polystyrene or styrene copolymer dispersions or dispersions produced by emulsion or suspension polymerization of polyvinyl chloride.

The process of the invention is most suitable for removing monomers, particularly vinyl chloride, from aqueous dispersions of vinyl chloride homo- co- and graft polymers containing at least 50% by weight, preferably 75 and more preferably 85% by weight of polymerized vinyl chloride.

The vinyl chloride homo-, graft- or copolymer dispersions to be treated according to the present invention can be prepared by continuous or discontinuous polymerization processes with or without the use of a seedy polymer. The polymers are prepared in aqueous emulsion suspension in the presence of from 0.001 to 3% by weight, preferably from 0.01 to 0.3% by weight, calculated on the monomers, of the usual free radical forming catalysts, for example diaryl and diacyl peroxides such as diacetyl, acetylbenzoyl, dilauroyl, dibenzoyl, bis-2,4-dichloro-benzoyl and bis-2-methyl-benzoyl peroxides; dialkyl peroxides such as di-tert.butyl peroxide; per-esters such as tert.butyl percarbonate, tert.buthl peracetate, tert.butyl peroctoate and tert.butyl perpivalate; dialkyl peroxy dicarbonates such as diisopropyl, diethyl-hexyl, dicyclohexyl and diethylcyclohexyl peroxy dicarbonates; mixed anhydrides of organic sulfoperacids and organic acids such as acetylcyclohexylsulfonyl peroxide; and azo compounds used as polymerization catalysts such as azoisobutyronitrile; persulfates, for example potassium, sodium and ammonium persulfates; hydrogen peroxide, tert.butyl hydroperoxide and other water-soluble peroxides, as well as mixtures of different catalysts. The peroxidic catalysts can also be used in the presence of from 0.01 to 1% by weight, calculated on the monomers, of at least one reducing substance suitable for the synthesis of a redox catalyst system, for example sulfites, bisulfites, dithionites, thiosulfates, and aldehyde sulfoxylates, for example formaldehyde sulfoxylate. The polymerization can also be carried out in the presence of soluble metal salts, for example of copper, silver, iron, or chromium, in amounts of from 0.05 to 10 ppm. calculated as metal on the monomer(s).

The polymerization can also be carried out in the presence of from 0.01 to 1% by weight, preferably from 0.05 to 0.3% by weight, calculated on the monomers, of at least one of the usual protective colloids, for example polyvinyl alcohols which may contain up to 40 mole % of acetyl groups; cellulose derivatives such as water-soluble methyl cellulose, carboxymethyl cellulose and hydroxyethyl cellulose; gelatin; copolymers of maleic acid or the semi-esters thereof; styrenes; polyvinyl pyrrolidone; and copolymers of vinyl acetate and vinyl pyrrolidone.

The polymerization can also be carried out in the presence of from 0.01 to 5% by weight, calculated on the monomers, of one or more emulsifiers which may be used in admixture with the above protective colloids. Suitable emulsifiers, which may be anionic, amphoteric, cationic, or non-ionic are, for example, alkali and alkaline earth metal and ammonium salts of fatty acids, for example of lauric, palmitic or stearic acid, of acid fatty alcohol sulfuric acid esters, paraffin sulfonic acids, alkylaryl sulfonic acids such as dodecylbenzene or dibutyl-naphthalene sulfonic acid, of sulfo-succinic acid dialkyl esters, as well as the alkali metal and ammonium salts of fatty acids containing epoxide groups, such as epoxy-stearic acid, of reaction products of peracids, for example per-acetic acid with unsaturated fatty acids such as oleic acid or linoic acid, or unsaturated hydroxyl derivatives of fatty acids such as ricinoleic acid. Suitable amphoteric or cationic emulsifiers are, for example, alkyl betains, such as dodecyl betain, as well as alkyl pyridinium salts such as lauryl pyridinium hydrochloride; and alkyl ammonium salts such as oxethyl dodecyl ammonoim chloride. Suitable non-ionic emulsifiers are, for example, partial fatty acid esters of polyhydric alcohols such as glycerol monostearate, sorbitol monostearate, sorbital monolaurate, oleate, or palmitate, polyhydroxy ethylene ethers of fatty alcohols or aramatic hydroxy compounds, polyoxyethylene esters of fatty acids and polypropylene oxide-polyethylene oxide condensation products.

Besides the catalysts, protective colloids and/or emulsifiers, the polymerization mixture may also contain buffer substances, for example alkali metal acetates, borax, alkali metal phosphates, alkali metal carbonates, ammonia, or ammonium salts of carboxylic acids; and molecular weight regulators, for example aliphatic aldehydes having from 2 to 4 carbon atoms, chloro- and bromo-hydrocarbons, for example di- and tri-chloro-ethylene, chloroform, bromoform and methylene chloride, and mercaptans.

Suitable polymerization auxiliaries for making the vinyl chloride polymers to be used are described, for example in "Polyvinylchlorid und Vinylchlorid-Mischpolymerisate" by H. Kainer, Springer Verlag, Berlin/-Heidelberg/New York, 1965, pp. 13–59.

For copolymerization with vinyl chloride, one or more of the following monomers can be used: olefins such as ethylene or propylene; vinyl esters of linear or branched carboxylic acids having from 2 to 20 carbon atoms, preferably 2 to 4 carbon atoms, for example vinyl acetate, propionate, butyrate and 2-ethylhexoate; vinyl-isotridecanoic acid esters; vinyl halides, for example vinyl fluoride, vinylidene fluoride, vinylidene chloride; vinyl ethers; vinyl pyridine; unsaturated acids such as maleic, fumaric, acrylic and methacrylic acid and the mono and diesters thereof with mono- and di-alcohols having from 1 to 10 carbon atoms; maleic anhydride; maleic inide and the N-substitution products thereof with aromatic, cycloaliphatic and optionally branched aliphatic substituents; acrylonitrile; and styrene.

For graft polymerization, elastomeric polymers can be used, which are obtained by polymerizing one or more of the following monomers: dienes, for example butadiene and cyclopentadiene; olefins such as ethylene and propylene; styrine; unsaturated acids such as acrylic and methacrylic acids and the esters thereof with mono- and dialcohols having from 1 to 10 carbon atoms; acrylonitrile; vinyl compounds, for example vinyl esters of linear and branched carboxylic acids having from 2 to 20 and preferably from 2 to 4 carbon atoms; and vinyl halides such as vinyl chloride and vinylidene chloride.

After the polymerization, further substances for stabilizing or improving the processing properties can be added to aqueous polymer dispersion. In special cases known anti-foaming agents may be added although this is generally not necessary.

BRIEF DESCRIPTION OF THE DRAWINGS

The device suitable to carry out the process of the invention will now be described in further detail and by way of examples with reference to the accompanying drawings of which

DESCRIPTION OF THE PREFERRED EMBODIMENTS

Figure 1:
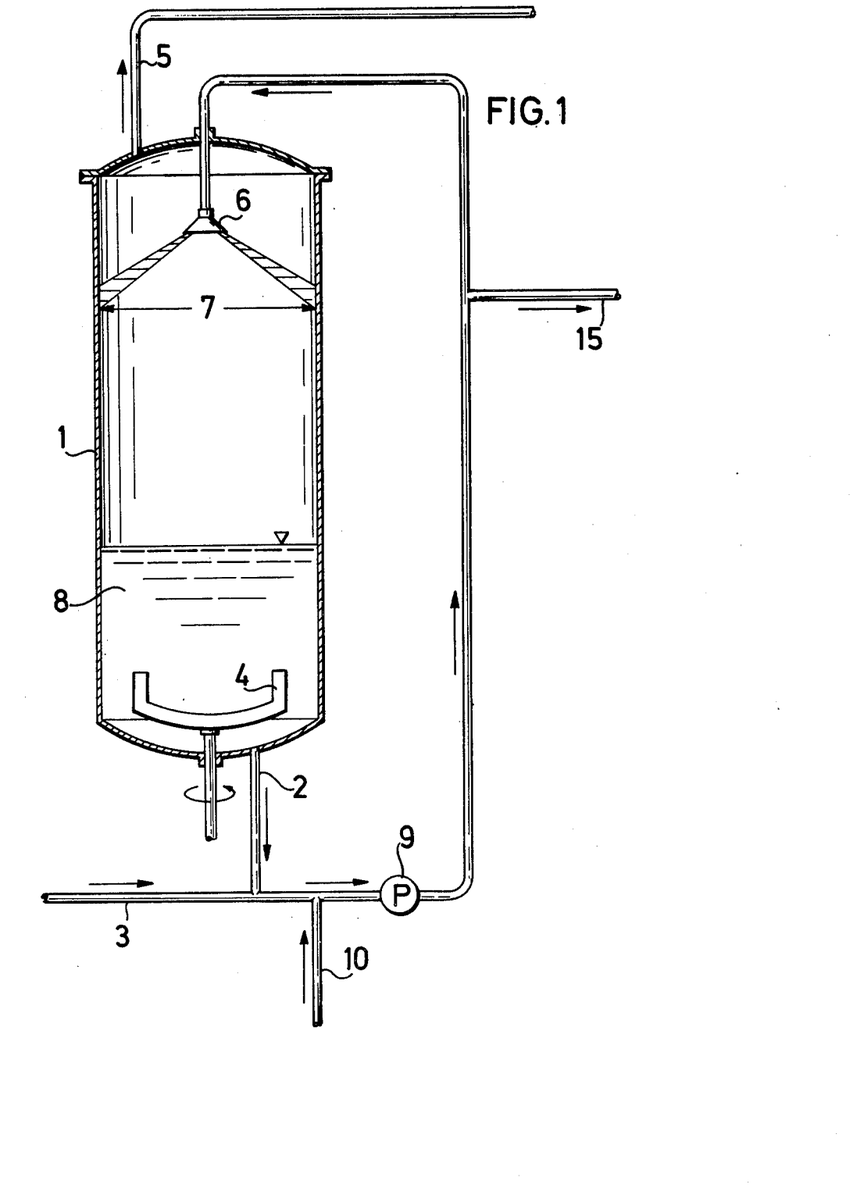
FIGS. 1 to 7 are longitudinal view of different modes of construction of the device and FIG. 3a is a cross sectional view taken along line 3a—3a of FIG. 3. In each figure like numerals designate like parts.

The device shown in FIG. 1 comprises a vertical cylindrical vessel 1 with an outlet for liquid 2 in the lower part, a stirrer 4 and an outlet for the withdrawal of gas 5 in the upper part of the vessel. In the interior the vessel contains a spraying device in the form of a spiral nozzle 6 spraying the liquid against the wall of the vessel in the form of a hollow cone 7. The level of the dispersion in the vessel is at such a height 8 that the surface of the dispersion is not hit by the sprayed material. The dispersion is conveyed to the spraying device by a pump 9 and heated by the means of steam introduced through conduit 10. Untreated dispersion is supplied through conduit 3 while the treated dispersion is discharged through conduit 15.

Figure 2:
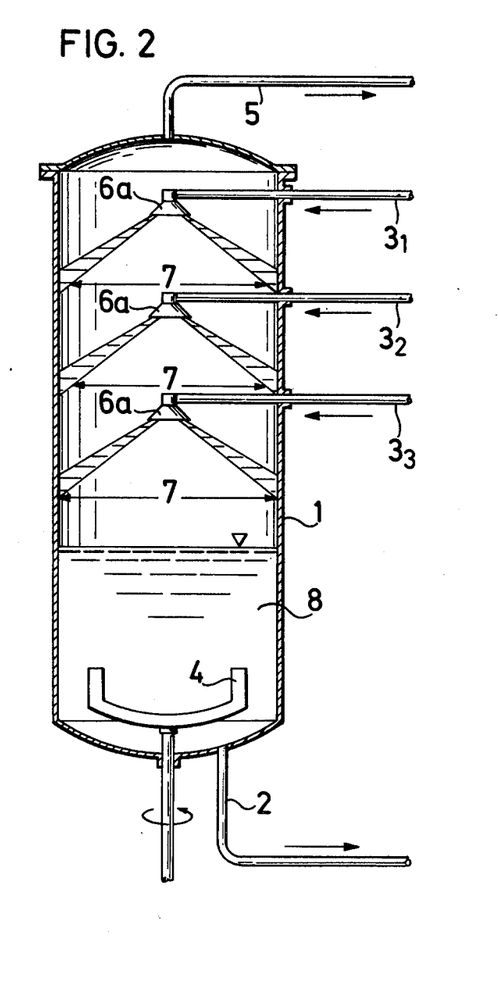

In the embodiment shown in FIG. 2, the vessel 1 is provided with two outlets, one for the withdrawal of liquid 2, the other one for the removal of gases 5, and with a stirrer 4. The spraying device is composed of three series-arranged nozzles 6a, one above the other, the cones of sprayed material of which do not overlap and practically do not hit the surface of the dispersion 8. Heated dispersion is supplied through three conduits $3_1$, $3_2$ and $3_3$, which may come from different stages of the process.

Figure 3:
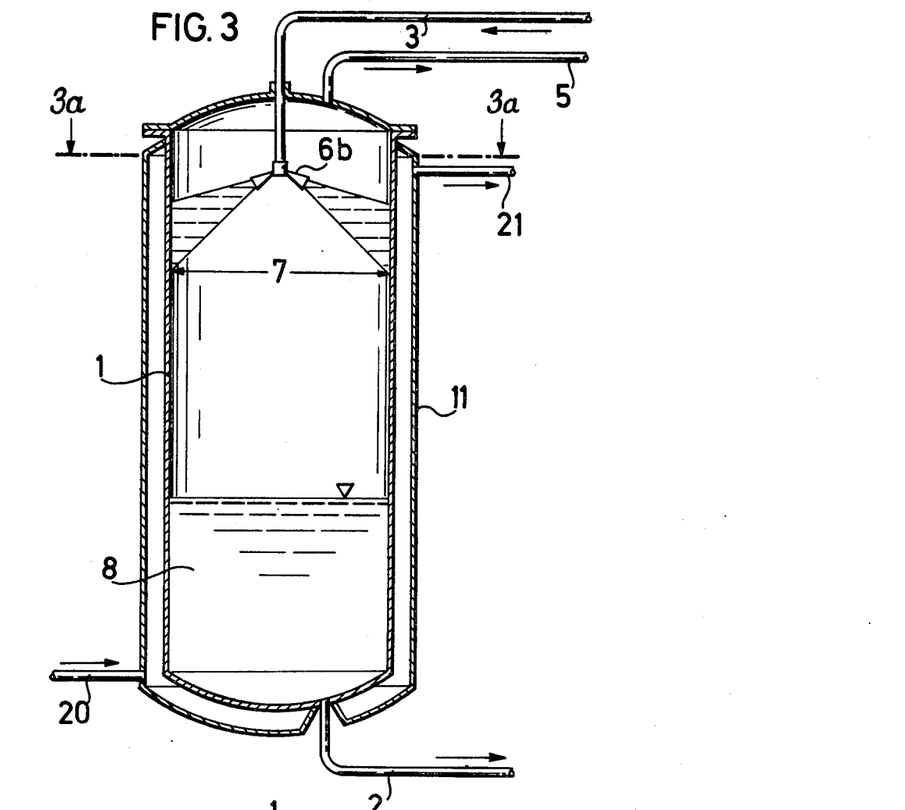
Figure 3A:
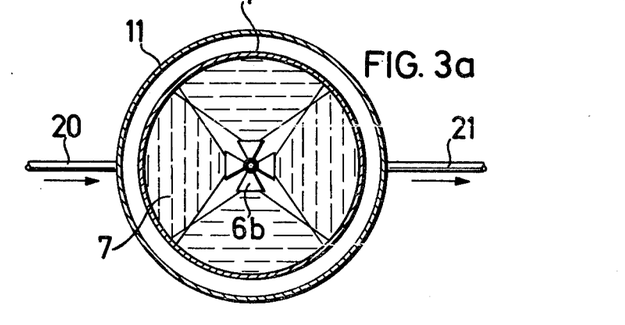

In the embodiment shown in FIGS. 3 and 3a, the spraying device consists of four flat nozzles 6b producing together a hollow cone of sprayed material 7. The vessel 1 is provided with a jacket 11 through which a heating or cooling medium is circulated which is supplied through conduit 20 and withdrawn through conduit 21.

In the embodiment represented in FIG. 4, a rotating spraying disk 12 is used as spraying device, the axis of rotation 13 of which coincides with the axis of the vessel. The dispersion is supplied through conduit 14 and sprayed in the form of a disk 7.

The device shown in FIG. 5 comprises a cylindrical vessel the lower part 1 of which has a smaller diameter than the upper part 25 and protrudes to a certain extent into the upper part so that an annular groove 19 is formed from which the liquid is withdrawn through conduit 15. Both parts of the vessel are provided with a spraying device 6a and 17, respectively, the cones of sprayed material emitted therefrom, 7 and 18, hitting the wall of the vessel above the level of the dispersion 8 and 39, respectively. The gaseous products are withdrawn at the top of the vessel through conduit 5. The dispersion is fed to the spraying device 6a of the lower part of the vessel through conduit 3, withdrawn at the bottom through conduit 2, pumped by pump 9 through a heat exchanger 24 and supplied to the upper spraying device through conduit 16. The treated dispersion is discharged through conduit 15. The upper section of the vessel is provided with a jacket 11 through which a liquid heating or cooling medium is circulated which is introduced through conduit 20 and discharged through conduit 21. Numerals 22 and 23 indicate the inlet and outlet for the heating medium for heat exchanger 24.

The apparatus suitable to carry out the process of the invention will now be described by way of example with reference to the accompanying drawing in which:

FIG. 5 is a longitudinal view of a series of three connected vessels, and

Figure 7:
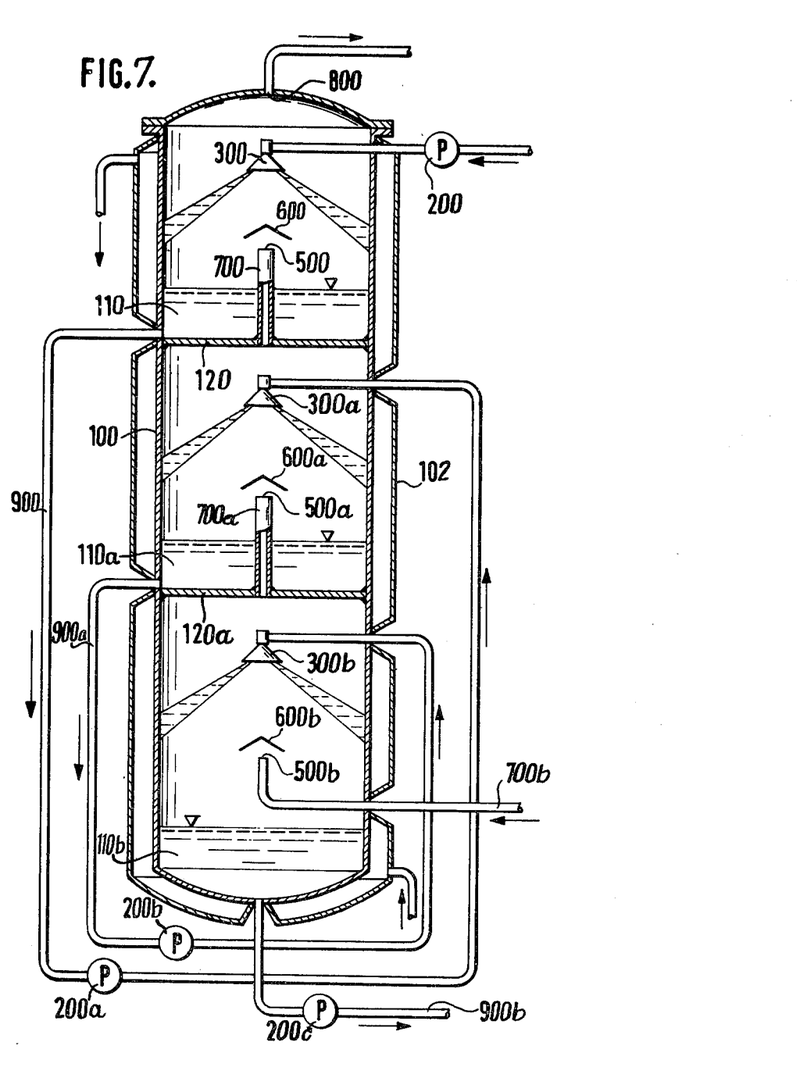

FIG. 7 is a longitudinal view of a vessel subdivided into three chambers.

Figure 6:
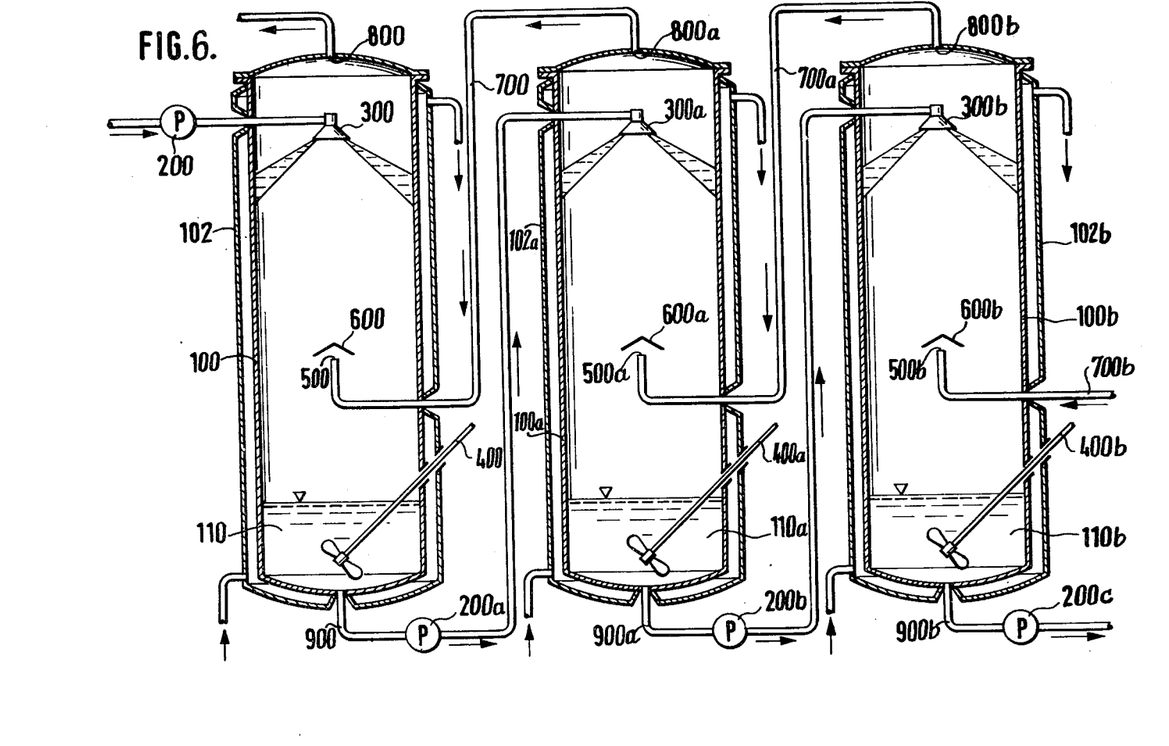

Referring to FIG. 6: through pumps 200, 200a and 200b, the dispersion is successively fed to three vertical, axially symmetrical vessels 100, 100a and 100b, it is sprayed through nozzles 300, 300a, 300b in the form of hollow cones, collected in the lower part of the vessels and stirred by stirring elements 400, 400a and 400b. Below the spray nozzles 300, 300a, 300b each vessel is provided with a gas inlet 500, 500a and 500b with cap 600, 600a and 600b for a better distribution of the gas current and a gas supply 700, 700a and 700b from the outside. The upper part of each vessel has a gas outlet 800, 800a and 800b. Through outlet 800 of the first vessel in the direction of flow of the dispersion the expelled monomers and further gaseous constituents are discharged from the apparatus. They can be fed to a recovery plant for the monomer(s) and optionally also to a gas purification. The gas outlets 800a and 800b of the vessels 100a and 100b are connected via conduits 700 and 700a with the gas inlet openings 500 and 500a of the respective preceding vessel. Hence, the gas travels in countercurrent flow with the dispersion.

Into the last vessel 100b in the direction of flow of the dispersion 110b inert gas, preferably steam, is blown through opening 500b. Through discharge conduits 900 and 900a the dispersion, successively freed from monomer, is transported by means of pumps 200a and 200b into the following vessels 100a and 100b and finally discharged through conduit 900c by means of pump 200c. The treated dispersion may be cooled and further processed in usual manner. Vessels 100, 100a and 100b are heated by a medium circulating in jackets 102, 102a and 102b, in the vessels the dispersion has such a level 110, 110a and 110b that it is not directly hit by the sprayed jet.

If desired, the vessels can be dispoed in different manner, for example one above the other in oblique position.

Referring now to FIG. 7, a vertical vessel is subdivided into three separate chambers by horizontal partition walls 120 and 120a. The other numerals have the same meaning as in FIG. 6.

The following examples illustrate the invention.

EXAMPLE 1

In a device as shown in FIG. 3 with a vessel having a diameter of 1.4 meters and a height of 2.8 meters, 1,500 kg of an aqueous dispersion, prepared by continuous emulsion polymerization and containing 45% by weight of polyvinyl chloride (K value 78) and 0.8% by weight of monomeric vinyl chloride, were sprayed per hour through 4 flat nozzles spraying the material in the form of a hollow cone with a scattering angle of 120°. The conditions and results are listed in the following table. The gaseous vinyl chloride was discharged at the head of the vessel, recovered, subjected to the usual purification and recycled into the polymerization. The treated dispersion was discharged at the bottom of the vessel. No heating or cooling medium was circulated through the jacket of the vessel.

When processed on a calander into a rigid sheet, the pulverulent polyvinyl chloride obtained after drying had the same processing properties as a powder made from an untreated dispersion.

EXAMPLE 2

In the device used as Example 1, 1,500 kg of an aqueous dispersion prepared by continuous emulsion polymerization and having a content of 45% by weight of polyvinyl chloride (K value 59) and 0.6 & by weight of monomeric vinyl chloride were sprayed per hour. The treated dispersion was discharged at the bottom of the vessel and the gaseous vinyl chloride at the head. Through the jacket a heating medium of 70° C. was circulated.

When processed on an extruder into rigid profiles, the polyvinyl chloride powder obtained after drying had the same properties as a powder obtained from an untreated dispersion.

EXAMPLE 3

A device as shown in FIG. 5 having the following dimensions were used: lower part of vessel 1 diameter 2 m, height 6 m, upper part of vessel 25 diameter 2.5 m, height 5 m. 6,300 kg per hour of aqueous dispersion, prepared by continuous emulsion polymerization containing 4% by weight of monomeric vinyl chloride and 42% by weight by vinyl chloride/butadiene/acrylonitrile copolymer with 93% by weight of polymerized vinyl chloride were sprayed in the lower part with a hollow cone nozzle 6a under a spraying angle of 90°, the dispersion collected at the bottom of the vessel was discharged, transported over pump 9 into heat exchanger 24 and then sprayed again in the upper part by means of a nozzle 17 forming a hollow cone of the material with a scattering angle of 90°. The jacket 11 of the vessel was heated to 70° C. by a liquid medium. The data are indicated in the following table.

The gaseous vinyl chloride escaping at the head of the vessel was passed to a recovery plant. The treated dispersion was withdrawn from the collecting groove 19 through conduit 15.

EXAMPLE 4

A device as shown in FIG. 1 was used having a diameter of 3 m and a height of 10 m. 10 m$^3$ of an aqueous dispersion, prepared by suspension polymerization and having a content of 33% by weight vinyl chloride (K value 55) were introduced per hour into the cycle system through conduit 3 and heated together with treated dispersion discharged through conduit 2° to 75° C. by steam having a pressure of up to 1.5 atmospheres introduced through conduit 10. By means of pump 9 the heated dispersion was fed to the spraying nozzle spraying the dispersion in the form of a hollow cone with a scattering angle of 90°. Through conduit 15, 10 m$^3$ of treated dispersion were discharged per hour. In the vessel the amount of dispersion was kept constant at about 20 m$^3$. The data are also indicated in the following table.

EXAMPLES 5 to 7:

The treatment was carried out as described in Example 4 with the exception that 20 m$^3$ of dispersion were supplied and withdrawn per hour and the pressure in the vessel and the inlet temperature were varied as indicated in the table.

TABLE

|  |  | Part I Examples | | | |
|---|---|---|---|---|---|
|  |  | 1 | 2 | 3 stage I | 3 stage II |
| untreated dispersion | inlet temperature at nozzle °C. | 70 | 70 | 55 | 70[4] |
|  | % by weight monomeric vinyl chloride[7] | 0.8[1] | 0.6[1] | 4[1] | 0.6[4] |
| treated dispersion | outlet temperature °C. | 55 | 70 | 40 | 70 |
|  | % by weight monomeric vinyl chloride[7] | 0.07[1] | 0.02[1] | 0.6[1] | 0.01[1] |
|  | pressure in vessel mm Hg | 150 | 250 |  | 265 |
|  | cross section of most narrow nozzle opening mm | 4[6] | 4[6] | 13 | 13 |
|  | mean diameter of sprayed particles[2] mm | 0.5 | 0.5 | 0.8 | 1 |

TABLE-continued

|  | Part I Examples | | | |
|---|---|---|---|---|
|  | 1 | 2 | 3 stage I | 3 stage II |
| issuing speed of sprayed particles from mouth of nozzle (m/sec) | 24 | 24 | 20 | 20 |

[1] calculated on dispersion, determined by gas chromatography
[2] measured according to Fraser & Eisenklam, loc.cit.
[3] measured according to H.Hege loc.cit.
[4] values of dispersion pretreated in stage I
[5] calculated on centrifuged solid having a moisture content of 20%
[6] all four flat nozzles had this diameter
[7] determined by the head-space method (Zeitschrift f. Analyt. Chemie, volume 255 (1971), pages 345 – 350)

TABLE

|  |  | Part II Examples | | | |
|---|---|---|---|---|---|
|  |  | 4 | 5 | 6 | 7 |
| untreated dispersion | inlet temperature at nozzle °C. | 75 | 80 | 85 | 90 |
|  | % by weight monomeric vinyl chloride[7] | 1.5[5] | 1.6[5] | 1.5[5] | 2.6[5] |
| treated dispersion | outlet temperature °C. | 70 | 76 | 79 | 83 |
|  | % by weight monomeric vinyl chloride[7] | 0.03[5] | 0.02[5] | 0.007[5] | 0.002[5] |
|  | pressure in vessel mm Hg | 330 | 400 | 440 | 565 |
|  | cross section of most narrow nozzle opening mm | 30 | 30 | 30 | 30 |
|  | mean diameter of sprayed particles[2] mm | 1.6 | 1.6 | 1.6 | 1.7 |
|  | issuing speed of sprayed particles from mouth of nozzle (m/sec) | 40 | 40 | 40 | 40 |

[1] calculated on dispersion, determined by gas chromatography
[2] measured according to Fraser & Eisenklam, loc.cit.
[3] measured according to H.Hege loc.cit.
[4] values of dispersion pretreated in stage I
[5] calculated on centrifuged solid having a moisture content of 20%
[6] all four flat nozzles had this diameter
[7] determined by the head-space method (Zeitschrift f. Analyt. Chemie, volume 255 (1971), pages 345 – 350)

The following examples illustrate an improved embodiment of the invention, the residual vinyl chloride content is determined by gas chromatography by the head-space method (cf. Zeitschrift fur analytische Chemie 255 (1971), pages 345 to 350, and the K value is measured according to DIN 53 726.

COMPARATIVE EXAMPLE 1

The treatment is carried out in a device according to FIG. 3 to be seen above and consisting of a vertical cylindrical vessel with an opening in the lower part for the discharge of liquid, an opening in the upper part for the removal of gas and a jacket with two conduits for a circulating heating or cooling medium. In the upper part of the vessel a spray device is mounted consisting of 4 flat nozzles producing a hollow cone of sprayed material with a scattering angle of about 120°. The vessel has a diameter of 1.4 meters and a height of 2.8 meters.

In the jacket water having a temperature of 75° circulates whereby the temperature of the material in the vessel is maintained constant at 70° C.

In the vessel are sprayed per hour 6,300 kg of an aqueous dispersion, prepared by continuous emulsion polymerization and containing 45% by weight of polyvinyl chloride (K-value 78) and 0.8% by weight of monomeric vinyl chloride. The gaseous vinyl chloride is withdrawn at the head and the treated dispersion at the bottom of the vessel. The level of the dispersion in the vessel is kept constant at a volume of 1.26 m³. The values obtained are listed in the following Table.

EXAMPLE 8

The treatment is carried out in an apparatus according to FIG. 6 of the annexed drawing consisting of 3 cylindrical vessels each having a diameter of 1.4 meters and a height of 2.8 meters, containing a spray nozzle forming a hollow cone of sprayed material and each having a gas inlet. 6,300 kg per hour of the dispersion as used in comparative Example 1 are sprayed, in each vessel a volume of 0.42 m³ of dispersion is kept constant. The jackets of the vessels are heated by water of 75° C. No steam is introduced and the dispersion is not stirred. The escaping gaseous constituents are conducted in countercurrent flow with the dispersion. The values obtained are indicated in the following Table.

A rigid sheet made on the calendar from the polyvinyl chloride powder prepared by drying the dispersion treated according to the invention has the same processing properties as a sheet of a powder made from an untreated dispersion.

COMPARATIVE EXAMPLE 2

The treatment was carried out in a device as shown in FIG. 1 of the copending application referred to above. The device is composed of a vertical cylindrical vessel with an opening to withdraw liquids and a stirrer in the lower part of the vessel and an opening to remove gas from the upper part and a spray device with spiral nozzle producing a hollow cone of sprayed material in the upper part. Steam can be introduced into the spray device. The vessel has a diameter of 3 meters and a height of 10 meters.

10 m³ of an aqueous dispersion, prepared by suspension polymerization, containing 32% by weight of polyvinyl chloride (K-value=70) and 1.5% by weight of monomeric vinyl chloride are sprayed in the vessel per hour. Steam is introduced into the inlet of the spray nozzle and completely condensed in the dispersion. The gaseous constituents are withdrawn at the head and the treated dispersion at the bottom of the vessel. In the vessel a volume of 5 m³ dispersion is kept constant and the dispersion is stirred at a circumferential speed of 3 m/sec. The values obtained are listed in the following table.

EXAMPLE 9

In the apparatus described in Example 8 10 m³ per hour of the dispersion as used in comparative Example 2 are sprayed. In each vessel a volume of dispersion of 1.66 m³ is kept constant. Steam is blown into the inert gas inlet of the last vessel in the direction of flow of the dispersion, the escaping gaseous constituents are conducted in countercurrent flow with the dispersion. The stirrers rotate with a circumferential speed of about 3 m/sec. The jackets are empty. The values obtained are indicated in the following table.

Rigid shaped structures made on an extruder from the polyvinyl chloride powder prepared by drying the dispersion treated according to the invention has the same processing properties as structures from a powder obtained from an untreated dispersion. EXAMPLE 10

The treatment is carried out as described in Example 9, but at higher temperature and pressure. The dispersion used is prepared by suspension polymerization and contains 33% by weight of polyvinyl chloride (K-value 68) and 1.35% by weight of vinyl chloride. In each vessel a volume of 1.11 m³ of dispersion is maintained constant. The values obtained are listed in the following table.

EXAMPLE 11

For the treatment an apparatus as described in Example 8 and represented in FIG. 6 is used with the exception that the dispersion is successively sprayed in 6 vessels of equal size having a diameter of 1.4 m and a height of 2.8 m. Steam is blown into the last and the third vessel in the direction of flow of the dispersion and the gaseous constituents are conducted in countercurrent flow with the dispersion. In each vessel a volume of 0.83 m³ of dispersion is maintained constant. The treated aqueous dispersion is obtained by suspension polymerization and contains 30.5% by weight, calculated on the dispersion, of a copolymer of 90% by weight of vinyl chloride and 10% by weight of vinyl acetate, the percentages being calculated on dry polymer (K-value 60). The values obtained are listed in the table following:

We claim:

1. A process for the removal of unreacted monomers from aqueous polymer dispersions being produced in aqueous phase by emulsion or suspension polymerization of polyvinyl chloride and its copolymers and graft copolymers containing up to 30% by weight of comonomers in a vessel comprising the steps of spraying the dispersion at a temperature of 50°–150° C. in droplets having an mean diameter of from 0.05 to 3 mm at an issuing speed in the range of from about 5–250 m/sec. onto a substantially vertical internal wall of the vessel, the distance between the spraying device and the wall of the vessel being in the range of from about 20–400 cm, the pressure in the vessel being maintained from 200 mm Hg below the saturation pressure of water in the dispersion up to 500 mm Hg above such saturation pressure whereby the release of monomer in gaseous form and retention of most of the water in liquid form are promoted while foaming of the dispersion is minimized, withdrawing gaseous constituents above the spray of the dispersion and collecting the sprayed dispersion in the lower part of the vessel.

2. The process of claim 1, wherein the dispersion is sprayed in the form of a hollow cone.

3. The process of claim 1, wherein the dispersion is sprayed in at least two series-connected vessels transporting the gaseous constituents in one direction and the dispersion in the opposite direction from one vessel to the other.

4. The process of claim 3, wherein the dispersion is sprayed in 2 to 10 series-connected vessels.

5. The process of claim 1, wherein at least one inert gas is added to the gaseous constituents.

6. The process of claim 5, wherein the inert gas is steam.

7. The process of claim 3, wherein the dispersion is sprayed in the form of a hollow cone, and the gaseous constituents are introduced into the vessels in a manner such that they stream through the hollow cone of the sprayed dispersion.

8. The process of claim 1, wherein the sprayed dispersion has a temperature of 70°–100° C.

9. The process of claim 1 wherein the issuing speed of the droplets is in the range of from about 10 to 100 m/sec.

10. The process of claim 1 wherein 0.2 to 5 kg water per 100 kg dispersion is evaporated from the dispersion in the vessel.

11. The process of claim 1, wherein the spray and the level of the collected liquid dispersion are regulated so that less than 5% by weight of the sprayed dispersion strikes the surface of the liquid.

* * * * *

TABLE

|  | Comparative Example 1 | Example 8 | Comparative Example 2 | | Example 9 | | Example 10 | Example 11 |
| --- | --- | --- | --- | --- | --- | --- | --- | --- |
| treatment temperature °C. | 70 | 70 | 80 | 90 | 80 | 90 | 100 | 95 |
| pressure (mm Hg) | 250 | 250 | 330 | 565 | 330 | 565 | 770 | 700 |
| number of stages | 1 | 3 | 1 | 1 | 3 | 3 | 3 | 6 |
| total residence time (min) | 12 | 3 × 4 = 12 | 30 | 30 | 30 | 30 | 20 | 30 |
| steam consumption (t/hr) | — | — | 0.2 | 0.3 | 0.2 | 0.3 | 0.33 | 0.3 |
| vinyl chloride content prior to treatment (wt. %) | 0.8 | 0.8 | 1.5 | 1.5 | 1.5 | 1.5 | 1.35 | 1.8 |
| vinyl chloride content after treatment (wt. %) | 0.06 | 0.009 | 0.02 | 0.009 | 0.0075 | 0.0008 | 0.0009 | 0.0008 |